US012297697B2

(12) United States Patent
Kaddouh

(10) Patent No.: US 12,297,697 B2
(45) Date of Patent: May 13, 2025

(54) VEHICLE LADDER

(71) Applicant: NISSAN NORTH AMERICA, INC., Franklin, TN (US)

(72) Inventor: Sam Kaddouh, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 935 days.

(21) Appl. No.: 17/085,810

(22) Filed: Oct. 30, 2020

(65) Prior Publication Data

US 2022/0136326 A1 May 5, 2022

(51) Int. Cl.
*E06C 5/02* (2006.01)

(52) U.S. Cl.
CPC .................................... *E06C 5/02* (2013.01)

(58) Field of Classification Search
CPC .................................... E06C 5/02
USPC .................................... 224/326
See application file for complete search history.

(56) References Cited

U.S. PATENT DOCUMENTS 3,590,952 A * 7/1971 Thomas .................. B63B 27/14 182/206
3,944,024 A * 3/1976 Adas .................. B63B 27/14 403/376
4,193,477 A * 3/1980 Broyles .................. E06C 7/08 182/228.5
4,249,683 A * 2/1981 Park .................. B62D 43/02 414/466
4,431,082 A * 2/1984 Bott .................. B60R 3/005 182/127
4,637,492 A * 1/1987 Herr .................. B63B 17/00 248/222.12
4,896,910 A * 1/1990 Carter .................. B62D 43/04 224/538
5,350,095 A * 9/1994 Stevens .................. B60P 3/002 224/310
5,553,673 A * 9/1996 Hackman .................. A62C 27/00 169/24
D442,289 S * 5/2001 Ziaylek, Jr. .................. D25/64
7,066,299 B1 * 6/2006 Fleming .................. E06C 7/48 182/127
7,434,858 B1 * 10/2008 Lastinger .................. B60P 3/002 296/3
9,463,748 B2 10/2016 Presley
9,945,179 B1 * 4/2018 Joldersma .................. E06C 5/02
D845,853 S * 4/2019 Annett .................. D25/64
10,738,532 B2 * 8/2020 Badillo .................. B60R 3/005
10,927,599 B2 * 2/2021 Nakari .................. E06C 5/24
2004/0069566 A1 * 4/2004 Bareket .................. B60R 3/00 182/127
2007/0090139 A1 4/2007 McKenzie
2012/0318178 A1 12/2012 Hanks et al.
2015/0122857 A1 * 5/2015 Ferman .................. B60R 9/058 224/309

(Continued)

*Primary Examiner* — Peter N Helvey
(74) *Attorney, Agent, or Firm* — Global IP Counselors, LLP

(57) ABSTRACT

A vehicle includes a vehicle body and a ladder. The vehicle body has a roof panel body structure and an underside body structure. The ladder has a first end and a second end. The first end is mounted to the roof panel body structure. The second end is mounted to the underside body structure so that the ladder is mounted to the vehicle's roof surface and to an underside surface of the vehicle.

12 Claims, 6 Drawing Sheets

(56) References Cited

U.S. PATENT DOCUMENTS

| | | | | |
|---|---|---|---|---|
| 2017/0050571 | A1* | 2/2017 | Badillo | B60R 3/005 |
| 2018/0290596 | A1 | 10/2018 | Fukushima et al. | |
| 2018/0354424 | A1* | 12/2018 | Maiorana | E06C 7/003 |
| 2022/0022440 | A1* | 1/2022 | Heath | A01K 97/10 |
| 2022/0332556 | A1* | 10/2022 | Kobel | B66F 9/0655 |
| 2022/0379814 | A1* | 12/2022 | Roumeliotis | B60R 3/007 |
| 2022/0396213 | A1* | 12/2022 | McCarthy | B60R 9/048 |
| 2023/0008183 | A1* | 1/2023 | Fitzgerald | G06N 3/08 |
| 2023/0020538 | A1* | 1/2023 | Hawass | B64U 10/60 |
| 2023/0167782 | A1* | 6/2023 | Tsukahara | F02F 1/18<br>123/195 R |

* cited by examiner

VEHICLE LADDER

BACKGROUND

Field of the Invention

The present invention generally relates to a vehicle ladder. More specifically, the present invention relates to a vehicle ladder fixedly mounted to a vehicle body.

Background Information

Vehicles, particularly large vehicles or work vehicles, can be equipped with a ladder or a service ladder that provides the vehicle's operator access with from the ground to upper portions (e.g., the roof) of the vehicle. The ladder enables the vehicle's operator to climb up the ladder's body and onto the roof area or a service platform to perform various service/maintenance operations, such as servicing, cleaning or accessing storage equipment.

SUMMARY

In view of the state of the known technology, one aspect of the present disclosure is to provide a vehicle comprising a vehicle body and a ladder. The vehicle body has a roof panel body structure and an underside body structure. The ladder has a first end and a second end. The first end is mounted to the roof panel body structure. The second end is mounted to the underside body structure so that the ladder is mounted to the vehicle's roof surface and to an underside surface of the vehicle.

In view of the state of the known technology, another aspect of the present disclosure is to provide a ladder configured to be mounted to a vehicle. The ladder comprises a pair of siderails, a plurality of rungs, a pair of top hanger plates and a bottom hanger plate. The siderails have a first end that defines a top end of the ladder. The siderails have a second end that defines a bottom end of the ladder. The plurality of rungs are connected to the pair of siderails. The top hanger plates are fixed to the first end of the siderails. The bottom hanger plate is fixed to the second end of the siderails.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
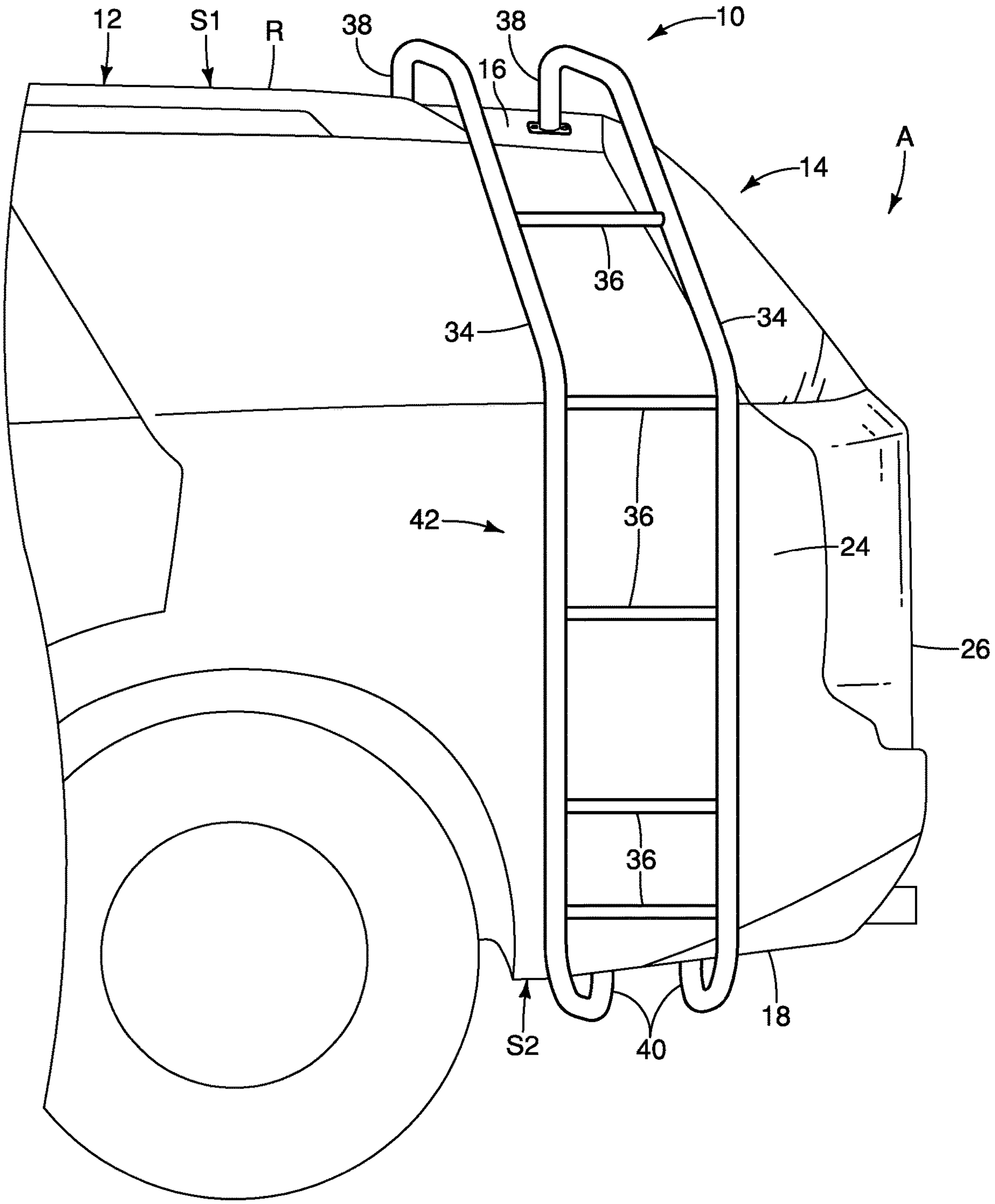
FIG. 1 is an elevational view of a rear portion of a vehicle equipped with a ladder in accordance with an illustrated embodiment.

Referring initially to FIG. 1, a portion of a vehicle 10 is illustrated in accordance with an embodiment. The vehicle 10 comprises a vehicle body 12 and a ladder 14 that is provided to the vehicle body 12. As shown, the vehicle is equipped with the vehicle ladder 14. Therefore, the vehicle 10 of the illustrated embodiment includes the ladder 14 that is provided to the vehicle body 12. While the vehicle 10 is illustrated as being a sports utility vehicle, it will be apparent to those skilled in the vehicle field from this disclosure that the vehicle 10 can alternatively be another type of vehicle, as a service vehicle that is equipped with the ladder 14 in accordance with the illustrated embodiment.

The vehicle body 12 has a vehicle roof R that is defined by a roof panel body structure 16 that defines roof surface 51 of the vehicle 10. In the illustrated embodiment, the roof panel body structure 16 can be roof panel or any other body structure that at least partially defines the vehicle's roof R or roof surface 51. The vehicle body 12 further includes an underside body structure 18 that defines an underside surface S2 of the vehicle 10. The underside body structure 18 is part of the lower body structure of the vehicle 10. In the illustrated embodiment, the ladder 14 is fixed to the roof panel body structure 16 at a first (top end) of the ladder 14 and is fixed to the underside body structure 18 at a second (bottom) end of the ladder 14. The ladder 14 is constructed and positioned with respect to the vehicle body 12 to enable the vehicle's 10 operator to access the vehicle's roof F, as will be further described below.

The vehicle body 12 further includes a pair of side panels 24 (a driver's side panel 24 shown in FIGS. 1 and 2), such as a quarter panel. The side panels 24 extend from the vehicle roof panel body structure 16 to the underside body structure 18. As shown, the vehicle 10 further includes a rear hatch 26 or a tailgate that at least partially defines a rear area A of the vehicle 10. The rear hatch 26 is movable between open and closed positions to enable a user's access to vehicle's 10 interior from the rear area A. The rear hatch 26 also extends from the roof panel body structure 16 to the underside body structure 18 at a location that is offset of the side panel 24. Preferably, the rear hatch 26 is directly adjacent to the side panel 24 and preferably aligns flush with the side panel 24 when the rear hatch 26 is in the closed condition.

Figure 2:
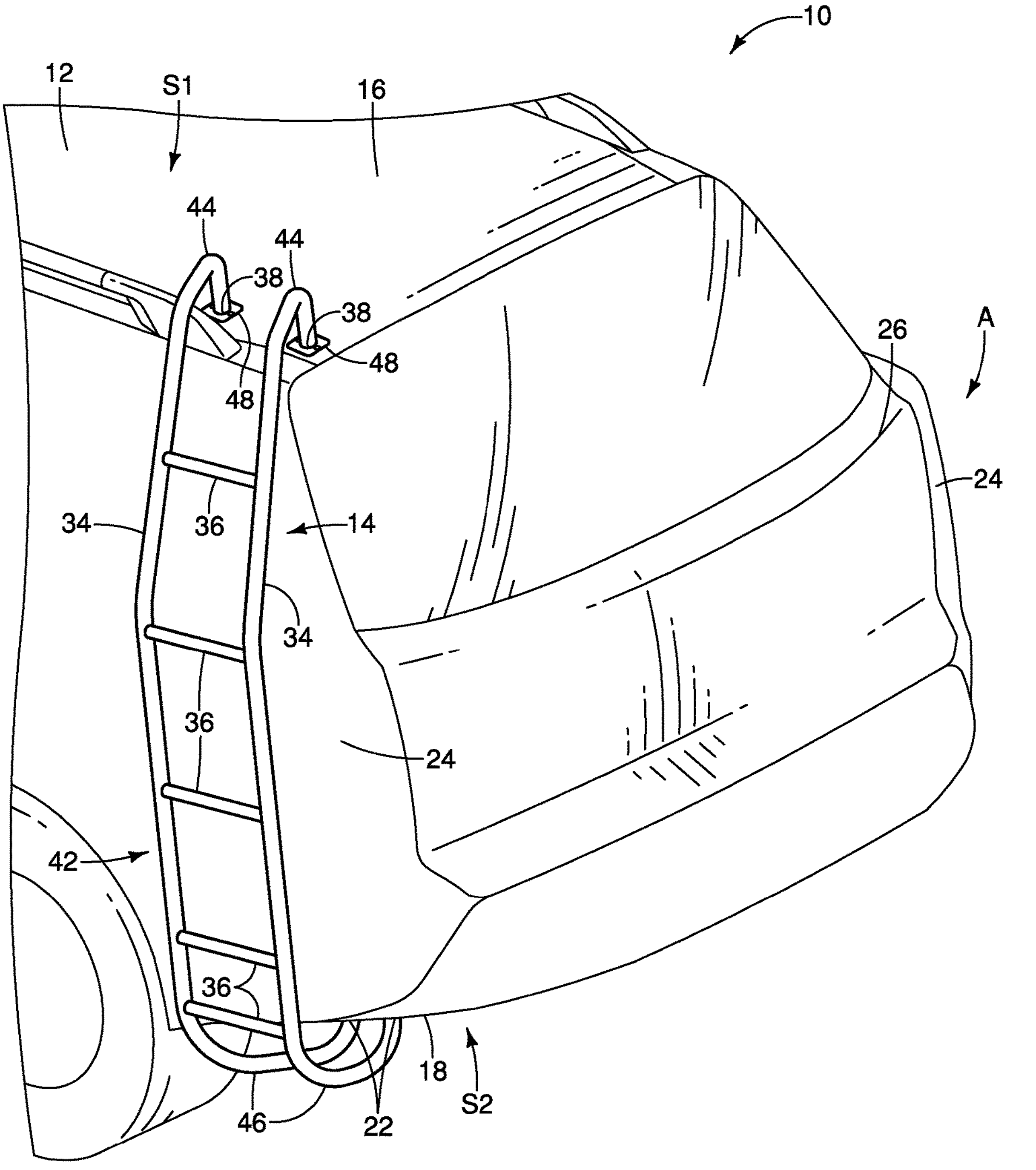
FIG. 2 is a perspective view of the rear portion of the vehicle of FIG. 1 equipped with the ladder.
Figure 3:
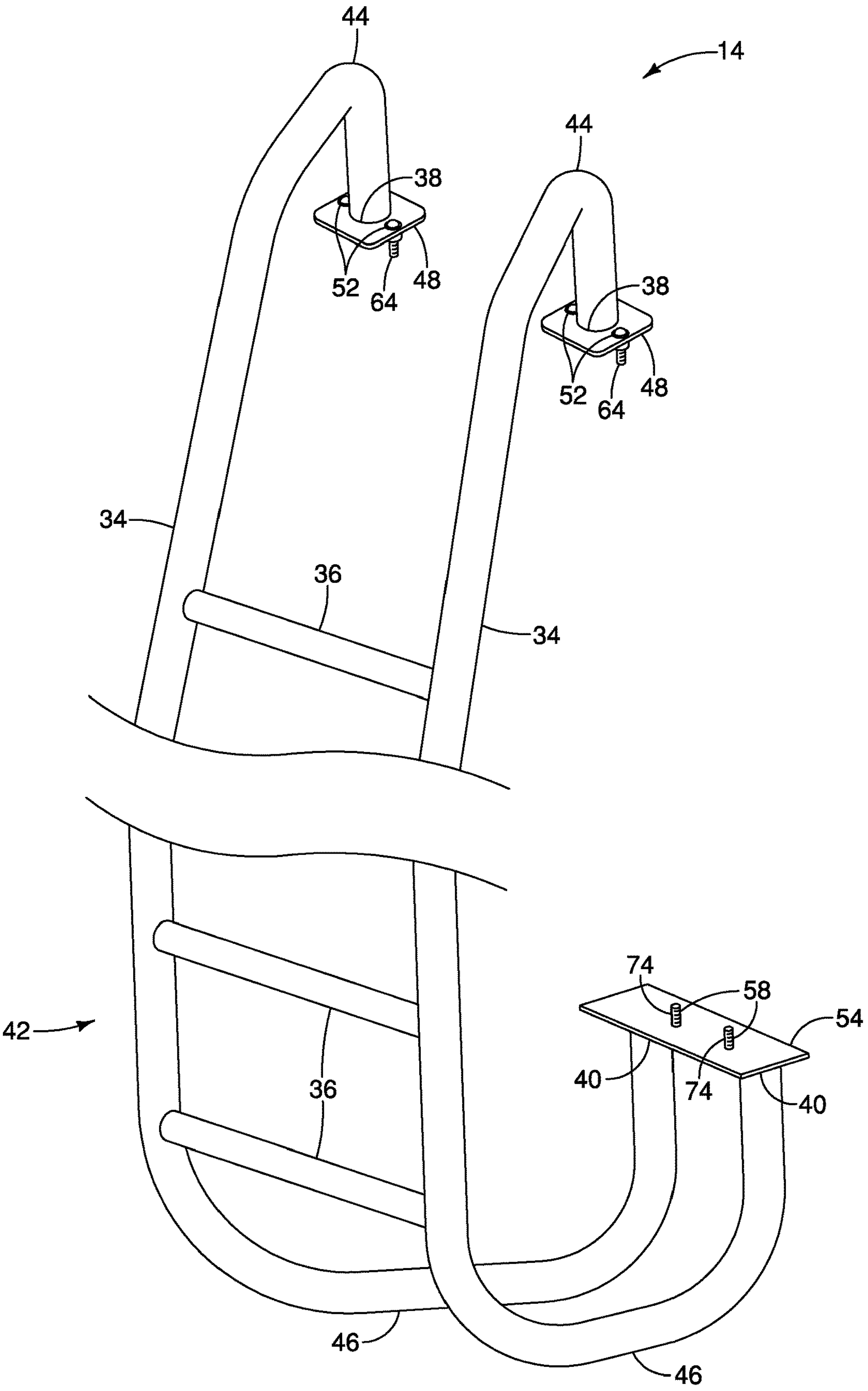
FIG. 3 is a perspective view of the ladder of FIGS. 1 and 2.
Figure 4:
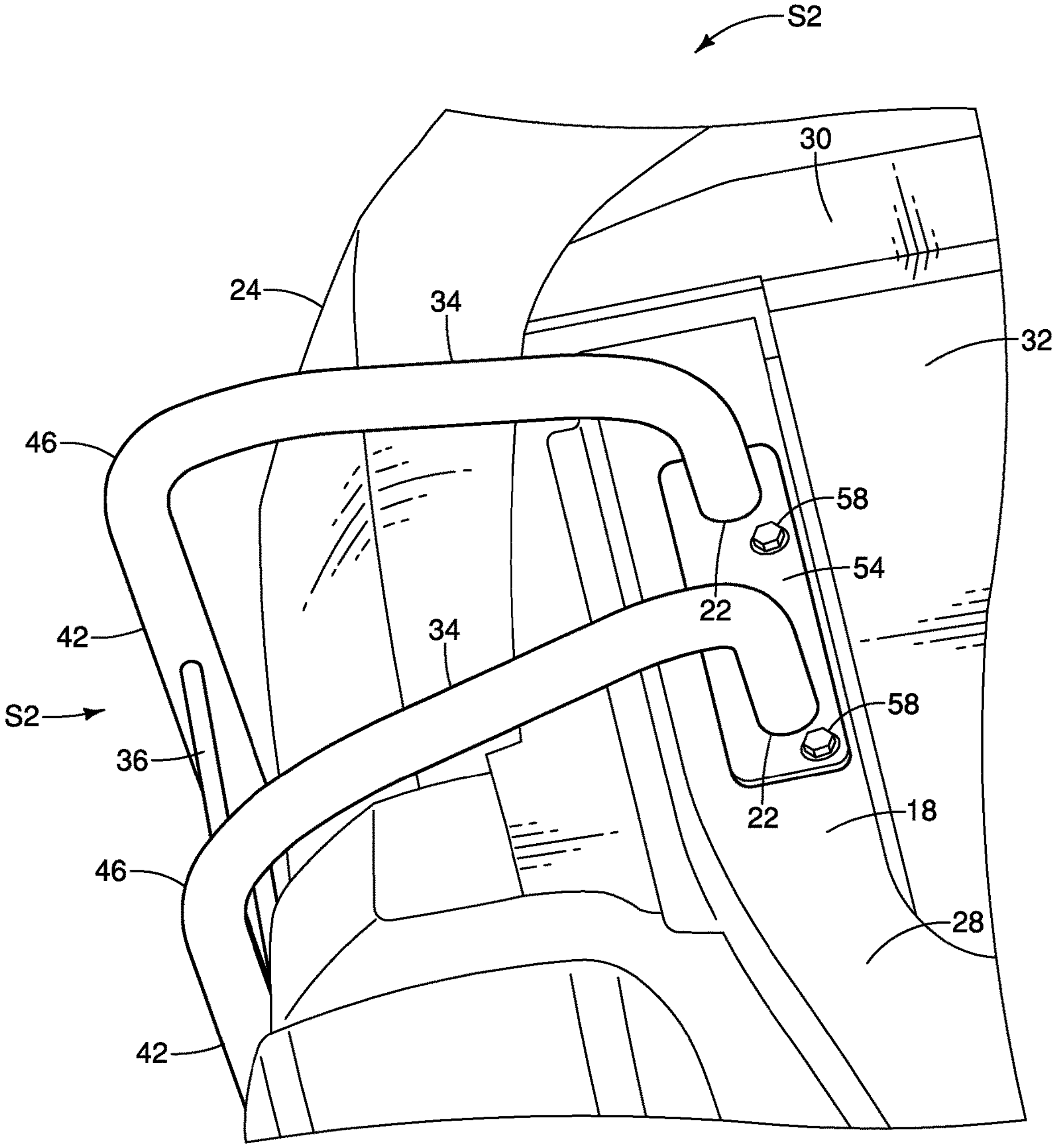
FIG. 4 is a plan view of a portion of an underside of the vehicle of FIGS. 1 and 2 showing the ladder installed to the underside.

Referring to FIGS. 2 to 5, the vehicle 10 includes an underbody frame rail 28, a hitch 30 and a floor pan 32. The underbody frame rail 28, the hitch 30 and the floor pan 32 together define an underside or the underside surface S2 of the vehicle 10. In the illustrated embodiment, the underside body structure 18 is preferably the underbody frame rail 28 of the vehicle 10 as seen in FIGS. 1, 4 and 6. Therefore, the vehicle's 10 underside S2 is illustrated as having the underbody frame rail 28 (e.g., the underside body structure 18).

The underbody frame rail 28 is made of a rigid material, such as carbon steel or preferably aluminum alloys to achieve a more light-weight construction. The underbody frame rail 28 reinforces the vehicle's 10 underbody strength and essentially serves as a skeleton of the vehicle 10. Typically, the underbody frame rail 28 is part of a subframe or chassis of the vehicle 10. That is, the underside body structure 18 of the illustrated embodiment is a supporting structure of the vehicle 10 to which other structural components are attached, such as the hitch 30 and the floor pan 32 of the vehicle 10. In the illustrated embodiment, the ladder 14 is attached to the underbody frame rail 28, as will be further discussed below.

As shown in FIG. 4, the underbody frame rail 28 is attached to the hitch 30. In the illustrated embodiment, the underbody frame rail 28 is attached to the hitch 30 by one or more fasteners, such as bolts (e.g., fasteners 58), as seen in FIG. 6. The hitch 30 is a substantially u-shaped metal bar that is attached to the underbody frame rail 28 for towing. It will be apparent to those skilled in the vehicle field from this disclosure that the hitch 30 is optionally provided to the vehicle 10 for towing purposes. It will also be apparent to those skilled in the vehicle field from this disclosure that the hitch 30 can alternatively be considered an underside body structure 18 that at least partially defines the underside surface S2 of the vehicle 10.

As shown in FIG. 4, the underbody frame rail 28 and the hitch 30 are fixed to the floor pan 32. The floor pan 32 is sheet of metal, such as carbon steel or aluminum alloys, that is fixed to the underbody frame rail 28 that substantially defines the vehicle's 10 floor or underside. In the illustrated embodiment, the floor pan 32 and the underbody frame rail 28 together make up the underbody structure that supports the vehicle body 12 structurally. It will be apparent to those skilled in the vehicle field from this disclosure that the underside body structure 18 can alternatively be the floor pan 32 that also partially defines the underside surface S2 of the vehicle. Therefore, it will be apparent to those skilled in the vehicle field from this disclosure that the ladder 14 can alternatively be mounted to the floor pan 32.

As stated, the ladder 14 is fixedly mounted to the vehicle body 12. In particular, as shown in FIGS. 1 and 2, the ladder 14 is mounted to a side body of the vehicle 10 offset of the vehicle's rear hatch 26. That is, the ladder 14 crosses the side panel 24 to extend from the roof panel body structure 16 to the underside body structure 18. In the illustrated embodiment, the ladder 14 does not obstruct opening and closing of the rear hatch 26. The ladder 14 is preferably provided at a location of the vehicle body 12 that is in the vicinity of the rear hatch 26 without obstructing the rear hatch 26 such that the ladder 14 is generally provided on the vehicle's rear area A. As shown in FIG. 1, the ladder 14 is positioned at the rear area A that is rearward of the vehicle's 10 doors and forward of the rear hatch 26. Alternatively speaking, the ladder 14 is mounted to the vehicle body 12 at a location that is closer to the rear hatch 26 than to a front end (not shown) of the vehicle 10.

Figure 5:
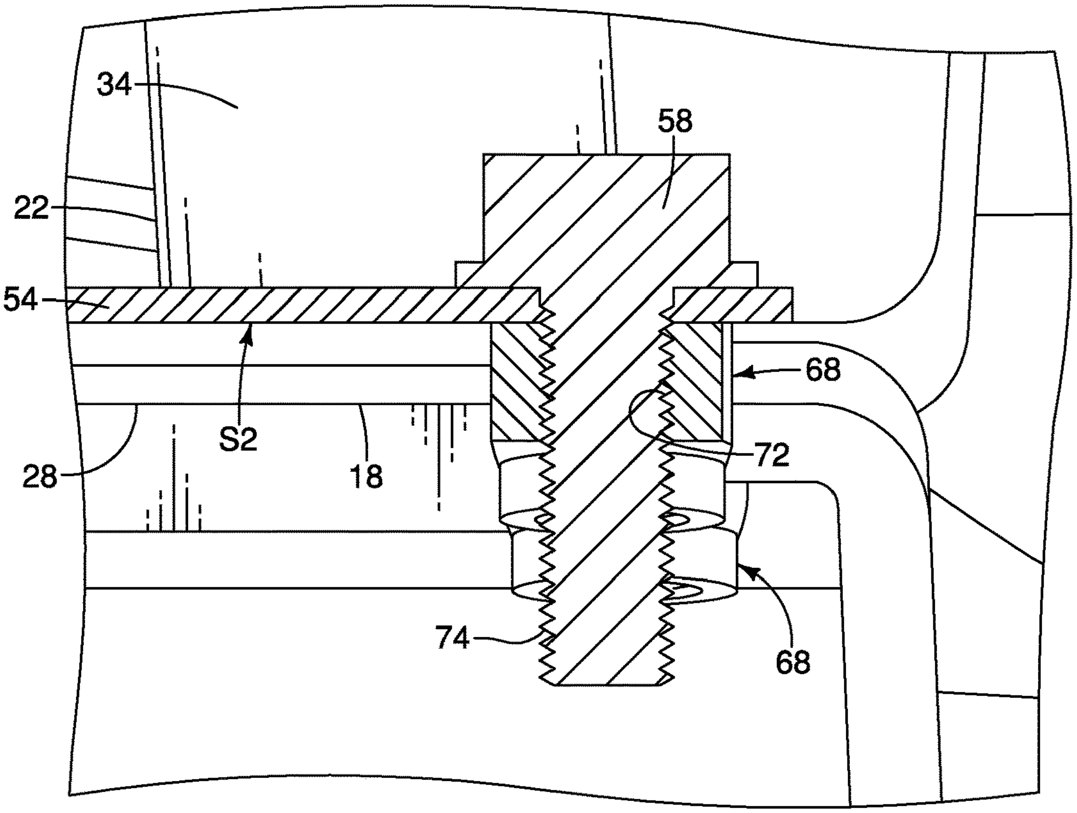
FIG. 5 is a cross-sectional view of a bottom portion of the ladder fixed to the underside of the vehicle.
Figure 6:
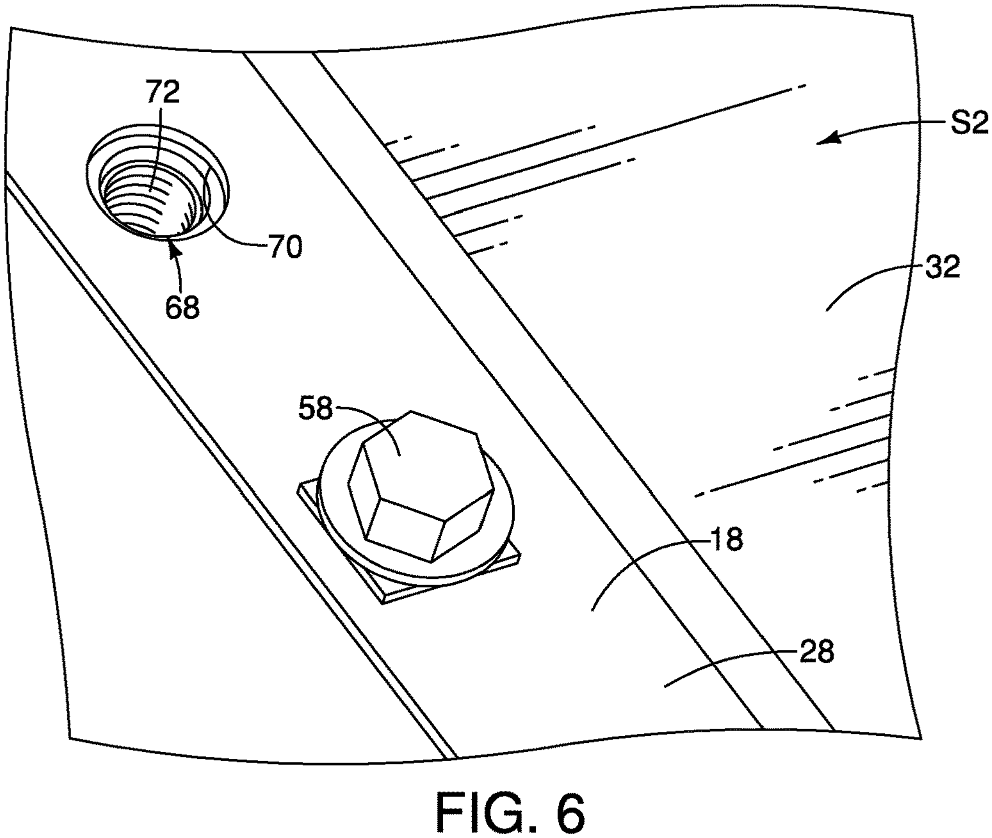
FIG. 6 is an enlarged view of the underside of the vehicle of FIGS. 4 and 5 with the ladder removed.
Figure 8:
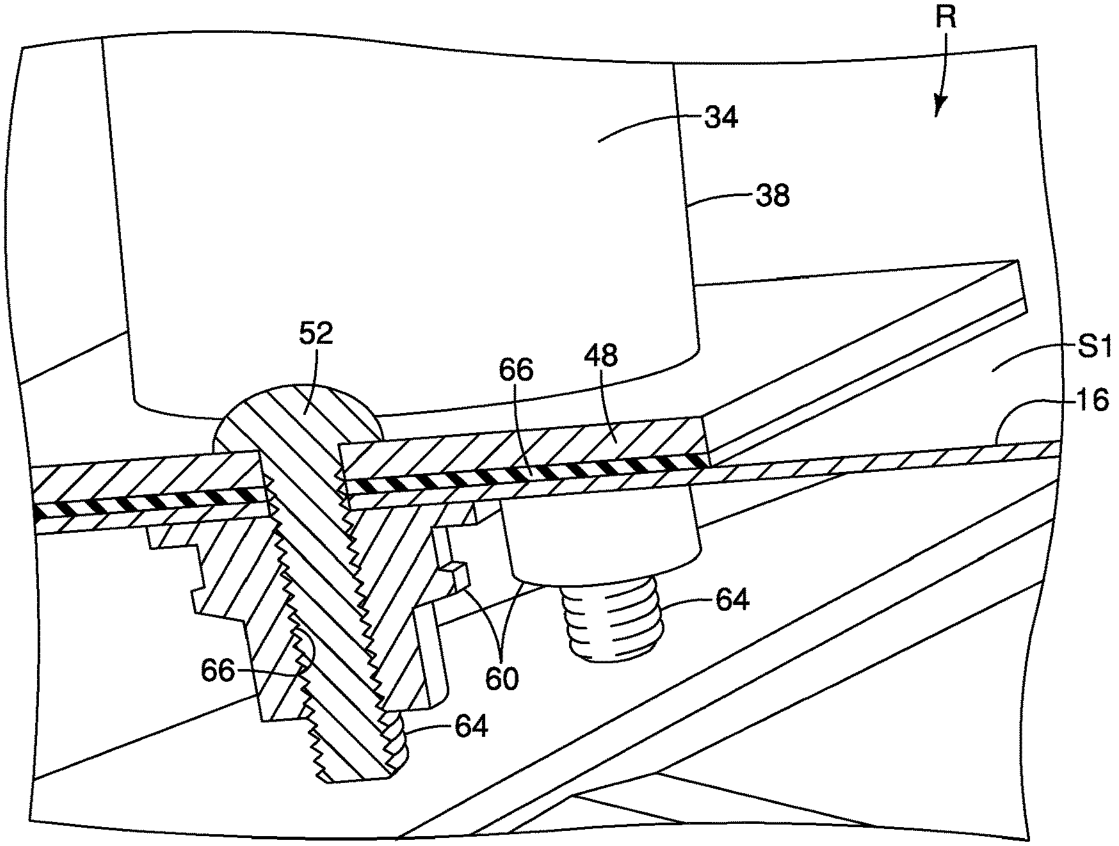
FIG. 8 is a cross-sectional view of the top portion of the ladder fixed to a roof of the vehicle.

Referring to FIGS. 1, 5 and 8, the ladder 14 comprises a pair of siderails 34 and a plurality of rungs 36 connected to the pair of siderails 34. The siderails 34 have a first end 38 that defines the top end of the ladder 14, as shown in FIGS. 1 and 2. The siderails 34 have a second end 40 that defines the bottom end of the ladder 14, as shown in FIGS. 1 to 4. Therefore the ladder 14 has the first end 38 (e.g., the top end 38) and the second end 40 (e.g., the bottom end 40).

As best seen in FIG. 3, the ladder 14 includes a longitudinal body 42, a top curved portion 44 and a bottom curved portion 46. In particular, the longitudinal body 42 of the ladder 14 is defined by a longitudinal length of the siderails 34. The longitudinal body 42 defines a longitudinal length of the ladder 14. The longitudinal body 42 is connected to the top curved portion 44 and the bottom curved portion 46. Therefore, the ladder 14 has a top portion (e.g., top curved portion 44) that is curved so to extend above the roof panel body structure 16 when the ladder 14 is installed to the vehicle body 12. The top portion 44 includes the first end 38 of the ladder 14. The ladder 14 has a bottom portion (e.g., the bottom curved portion 46) that that is curved to so extend below the underside body structure 18, as seen in FIGS. 1, 2 and 4. The bottom portion 46 includes the second end 40 of the ladder 14.

The rungs 36 substantially define a lateral length of the ladder 14. The top curved portion 44 connects the longitudinal body 42 and the top end 38 of the siderails 34. The bottom curved portion 46 connects the longitudinal body 42 and the bottom end 40 of the siderails 34. As best seen in FIG. 3, the top and bottom curved portions 44 and 46 curve toward each other along the longitudinal direction of the ladder 14. Therefore, top and bottom ends 38 and 40 of the ladder 14 face each other along the longitudinal direction of the ladder 14. The longitudinal body 42 crosses the side panel 24 of the vehicle body 12 as seen in FIGS. 1 and 2. Alternatively speaking, the longitudinal body 42 overlaps over the side panel 24 when the ladder 14 is mounted to the vehicle body 12 so that a user can climb over the side panel 24 via the ladder 14 in order to access the vehicle roof R.

Figure 7:
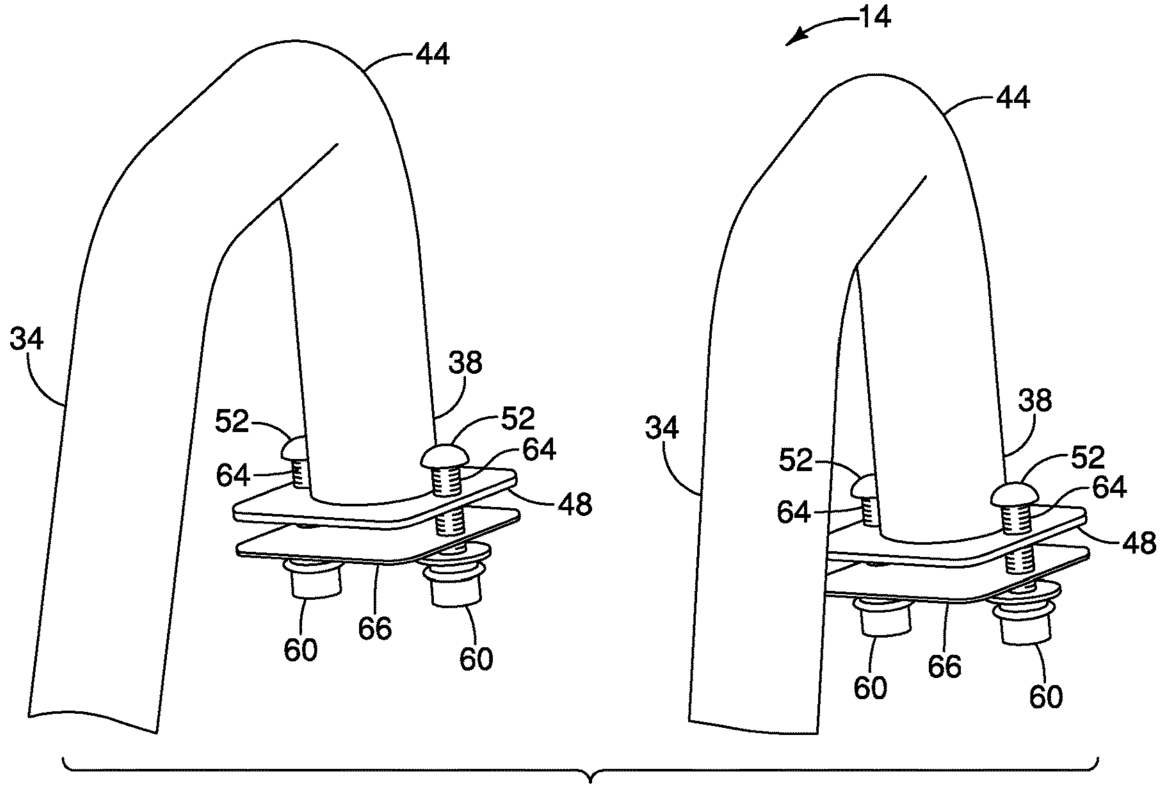
FIG. 7 is a top portion of the ladder.

Referring to FIGS. 2, 3 and 7, the ladder 14 further includes a pair of top hanger plates 48 that are fixed to the top end 38 of the pair siderails 34. The top hanger plates 48 are part of the top end 38 of the ladder 14. Alternatively speaking, the top end 38 includes the top hanger plates 48. As shown, each of the pair of top hanger plates 48 is fixed to one of the siderails 34 at the top end 38. As seen in FIG. 8, the top hanger plates 48 are fixed to the roof panel body structure 16 so to attach the ladder 14 to the vehicle body 12 at the top end 38 of the ladder 14. Therefore, the first end 38 of the ladder 14 is mounted to the roof panel body structure 16.

It will be apparent to those skilled in the vehicle field from this disclosure that top hanger plates 48 can be modified to be a single piece member. That is, it will be apparent to those skilled in the vehicle field from this disclosure that the ladder 14 can include a single one-piece top hanger plate that is attached to each of the top end 38 of the siderails 34. In the illustrated embodiment, the top hanger plates 48 are also preferably welded to the top end 38 of the siderails 34. However, it will be apparent to those skilled in the vehicle field from this disclosure that the top hanger plates 48 can be fixed to the siderails 34 by alternative means, such as via fasteners and/or threaded attachment, etc.

As seen in FIGS. 7 and 8, each of the pair of top hanger plates 48 includes at least one receiving opening for receiving a corresponding fastener 52 for attaching the top hanger plates 48 to the roof panel body structure 16. Preferably, each of the top hanger plates 48 includes a pair of top receiving openings. Each of the pair of top receiving openings receives a corresponding top fastener 52 for attaching the top hanger plates 48 to the roof panel body structure 16. Therefore, the ladder 14 preferably includes at least one top fastener 52 at the top end 38 of the ladder 14. Preferably, the ladder 14 includes a pair of top fasteners 52 for each of the top hanger plates 48. Therefore, the ladder 14 preferably includes two pairs of top fasteners 52 for attaching the top end 38 of the ladder 14 to the roof panel body structure 16.

Referring to FIGS. 3 to 5, the ladder 14 further includes a bottom hanger plate 54 fixed to the second end 40 of the siderails 34. In the illustrated embodiment, the bottom hanger plate 54 is fixed to both of the siderails 34 at the bottom end 40. Therefore, the bottom hanger plate 54 is preferably a single one-piece member that is welded to the siderails 34 at the bottom end 40. However, it will be apparent to those skilled in the vehicle field from this disclosure that the bottom hanger plate 54 can be fixed to the siderails 34 via alternative attachment means, such as via fasteners and/or threaded attachment. As shown in FIG. 4, the bottom hanger plate 54 includes a pair of bottom receiving openings for receiving a pair of bottom fasteners 58 for attaching the bottom end 40 of the siderails 34 to the vehicle underside body structure 18. Therefore, the ladder 14 includes a pair of bottom fasteners 58 for fastening the bottom end 40 of the ladder 14 to the underside body structure 18.

Referring to FIGS. 7 and 8, the vehicle 10 further includes a top fastening receiving structure 60 that is fixed to roof panel body structure 16. In the illustrated embodiment, the vehicle includes two pairs of top fastening receiving structures 60, each of the top fastening receiving structures 60 receives a corresponding one of the top fasteners 52 for attaching the top end 38 of the ladder 14 to the roof panel body structure 16. Therefore, the ladder 14 includes the top fastener(s) 52 that fixes the first end 38 of the ladder 14 to the top fastening receiving structure 60. It will be apparent to those skilled in the vehicle field from this disclosure that the vehicle can include additional or fewer top fastening receiving structures 60 for attachment of the ladder 14 to the vehicle roof R as needed and/or desired.

In the illustrated embodiment, the top fastening receiving structures 60 are first nuts 60. Because each of the first nuts 60 are identical with respect to each other in structure, only one of the first nuts 60 will be further discussed for brevity. As shown in FIG. 8, the first nut 60 is pre-welded to an inside surface of roof panel body structure 16. The inside surface faces away from the vehicle exterior and towards a vehicle interior. Alternatively speaking, the inside surface of the roof panel body structure 16 faces in a downward direction of the vehicle 10. That is, the first nut 60 is pre-welded to the vehicle body 12 and receives the top fastener 52. The first nut 60 is therefore a weld nut. In the illustrated embodiment, the first nut 60 is welded to the roof panel. Preferably, the first nut 60 is a rivet-type weld nut that is made of metal and receives the top fastener 52.

As shown in FIG. 8, the top fastener 52 extends through an opening of the roof panel body structure 16 to be received by the first nut 60. During installation of the ladder 14 to the roof panel body structure 16, the user drills an opening of the roof panel body structure 16. Preferably, the ladder 14 is provided with a template (not shown) directing the user where to drill the openings. In particular, the user will preferably drill two pairs of openings, each opening to correspond to the location of the first nuts 60 located on the inside surface of the roof panel body structure 16. Once the openings are drilled, the top fasteners 52 are installed into the respective openings and received by the respective ones of the first nuts 60. The first nut 60 includes a threaded interior 62 that mates with a threaded portion 64 of the top fastener 52. As seen in FIG. 7, the ladder 14 is preferably provided with a pair of gaskets 66 that are each provided to a corresponding one of the top hanger plates 48. When the top hanger plates 48 are attached to the roof panel body structure 16, the gaskets 66 are positioned between the top hanger plates 48 and the roof panel body structure 16 to prevent water intrusion into the openings.

Referring to FIGS. 5 and 6, the vehicle 10 includes one or more bottom fastening receiving structures 68. The bottom fastening receiving structure 68 are fixed to the underside body structure 18. In the illustrated embodiment, the vehicle 10 includes a pair of bottom fastening receiving structures 68, each of the bottom fastening receiving structures 68 receives a corresponding one of the bottom fasteners 58 for attaching the bottom end 40 of the ladder 14 to the underside body structure 18. The bottom fastening receiving structures 68 are second nuts 68 that are identical in structure to the first nut 60. The second nuts 68 are weld nuts. Therefore, the second nuts 68 are also pre-welded to an inside surface of the underside body structure 18.

Because each of the second nuts 68 are identical with respect to each other in structure, only one of the second nuts 68 will be further discussed for brevity. As shown in FIG. 5, the second nut 68 is pre-welded to the inside surface of underside body structure 18. The inside surface faces of the underside body structure 18 away from the vehicle exterior and towards a vehicle interior. Alternatively speaking, the inside surface of the underside body structure 18 faces in a upward direction of the vehicle 10. That is, the second nut 68 is pre-welded to the vehicle body 12 and receives the bottom fastener 58.

Referring to FIGS. 4 to 6, the second end 40 of the ladder 14 is mounted to the underside body structure 18 so that the ladder 14 is also mounted to the underside surface S2 of the vehicle. It will be apparent to those skilled in the vehicle field from this disclosure that the vehicle can include additional or fewer bottom fastening receiving structures 68 for attachment of the ladder 14 to the vehicle underside as needed and/or desired.

As shown in FIGS. 5 and 6, the bottom fastener 58 extends through an opening of the underside body structure 18 to be received by the second nut 68. During installation of the ladder 14 to the underside body structure 18, the bolts 58 attaching the hitch 30 to the underbody frame rail 28 are removed to expose the second nuts 68 that are pre-welded to the underside body structure 18. The bolts 58 are removed so that the bottom hanger plate 54 is positioned over the openings that lead to the second nuts 68. In particular, the bottom receiving openings of the bottom hanger plate 54 are positioned to correspond over the openings of the underside body structure 18 so to be positioned over the second nuts 68. The bolts 58 are re-installed into the respective openings 70 of the underside body structure 18 and the bottom receiving openings. Therefore, the bolts 58 are considered the bottom fasteners 58 that are received by the respective ones of the second nuts 68. As seen in FIG. 5, the second nut 68 includes a threaded interior 72 that mates with a threaded portion 74 of the bottom fastener 58. The bottom fastener 58 extends through the opening 70 of the underside body structure 18 to be received by the second nut 68.

General Interpretation of Terms

In understanding the scope of the present invention, the term "comprising" and its derivatives, as used herein, are intended to be open ended terms that specify the presence of the stated features, elements, components and/or groups but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle ladder. Accordingly, these terms, as utilized to describe the present invention should be interpreted relative to a vehicle equipped with the vehicle ladder.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:

a vehicle body having a roof panel body structure and an underside body structure;

a roof rack mounted to the roof panel body structure;

a ladder having a top curved portion positioned at least partially rearward of the roof rack on the roof panel body structure and extending at least partially above the roof rack, the ladder further having a bottom curved portion, the top curved portion extending above the roof panel body structure and the bottom curved portion extending below the underside body structure, the top curved portion and the bottom curved portion curving toward each other in a longitudinal direction of the ladder, a first end of the top curved portion being mounted to the roof panel body structure a second end of the bottom curved portion being mounted to the underside body structure so that the ladder is mounted to the vehicle's roof surface and to an underbody frame rail at an underside surface of the vehicle;

a first nut that is pre-welded to an inside surface of the roof panel body structure, the first nut receiving the top curved portion; and a second nut that is pre-welded to an inside surface of the underside body structure, the second nut receiving the bottom curved portion.

2. The vehicle according to claim 1, wherein the ladder includes a top fastener that fixes the first end of the ladder to the top fastening receiving structure, and includes a bottom fastener that fixes the second end of the ladder to the bottom fastening receiving structure.

3. The vehicle according to claim 1, wherein the top fastener extends through an opening of the roof panel body structure to be received by the first nut.

4. The vehicle according to claim 3, wherein the bottom fastener extends through an opening of the underbody frame rail to be received by the second nut.

5. The vehicle according to claim 1, wherein the ladder is mounted to a side body of the vehicle between the vehicle's rear hatch and the roof rack.

6. A ladder configured to be mounted to an underbody frame rail of a vehicle and configured to be mounted to an inside surface of a roof panel body of the vehicle, the ladder comprising:

a pair of siderails having a first end that defines a top end of the ladder and a second end that defines a bottom end of the ladder;

a plurality of rungs connected to the pair of siderails;

a pair of top hanger plates fixed to the first end of the pair siderails defining a top end of the ladder having a vehicle roof contact surface; and a bottom hanger plate fixed to the second end of the siderails defining a bottom end of the ladder having a vehicle underbody frame rail contact surface, the ladder including a longitudinal body connected to a top curved portion to be received by a first nut that is pre-welded to an inside surface of a roof panel body of the vehicle, the ladder further including a bottom curved portion to be received by a second nut that is pre-welded to the underbody frame rail, the top and bottom curved portions curving toward each other in a longitudinal direction of the ladder such that the top hanger plates and the bottom hanger plate face each other.

7. The ladder according to claim 6, wherein each of the pair of top hanger plates is fixed to one of the siderails at the first end, and the bottom hanger plate is fixed to both of the siderails at the second end.

8. The ladder according to claim 7, wherein the bottom hanger plate is a single one-piece member.

9. The ladder according to claim 8, wherein each of the pair of top hanger plates includes a receiving opening for receiving a fastener.

10. The ladder according to claim 9, wherein the bottom hanger plate includes a pair of receiving openings for receiving a pair of fasteners.

11. The ladder according to claim 6, wherein the top curved portion connects the longitudinal body and the first end.

12. The ladder according to claim 11, wherein the bottom curved portion connects the longitudinal body and the second end.

* * * * *